(12) United States Patent
Shipman et al.

(10) Patent No.: US 9,751,590 B2
(45) Date of Patent: Sep. 5, 2017

(54) BICYCLE REAR DERAILLEUR WITH A DAMPER ASSEMBLY

(71) Applicant: SRAM, LLC, Chicago, IL (US)

(72) Inventors: Christopher Shipman, Chicago, IL (US); Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 165 days.

(21) Appl. No.: 14/460,492

(22) Filed: Aug. 15, 2014

(65) Prior Publication Data
US 2016/0046352 A1 Feb. 18, 2016

(51) Int. Cl.
| | |
|---|---|
| B62M 9/126 | (2010.01) |
| B62M 9/128 | (2010.01) |
| B62M 9/1248 | (2010.01) |
| B62M 9/16 | (2006.01) |

(52) U.S. Cl.
CPC ............ *B62M 9/126* (2013.01); *B62M 9/128* (2013.01); *B62M 9/1248* (2013.01); *B62M 9/16* (2013.01)

(58) Field of Classification Search
CPC .... B62M 9/128; B62M 9/126; B62M 9/1248; B62M 9/16
USPC ................................................ 474/80; 29/480
See application file for complete search history.

(56) References Cited

U.S. PATENT DOCUMENTS

| | | | |
|---|---|---|---|
| 4,406,643 A | 9/1983 | Shimano | |
| 5,152,720 A * | 10/1992 | Browning | ............ B62M 9/1242 474/80 |
| 8,744,699 B2 * | 6/2014 | Yamaguchi | ............. B60T 7/102 701/51 |
| 2009/0054183 A1 * | 2/2009 | Takachi | .................... B62M 9/16 474/80 |
| 2012/0083371 A1 | 4/2012 | Yamaguchi et al. | |
| 2012/0083372 A1 | 4/2012 | Yamaguchi et al. | |
| 2013/0203532 A1 | 8/2013 | Jordan | |
| 2013/0288834 A1 * | 10/2013 | Yamaguchi | ............ B62M 9/126 474/80 |
| 2014/0371013 A1 * | 12/2014 | Yamaguchi | .......... B62M 9/1244 474/122 |

FOREIGN PATENT DOCUMENTS

| | | |
|---|---|---|
| CN | 103707994 A | 4/2014 |
| DE | 202007019470 U1 | 11/2012 |
| TW | M481882 U | 7/2014 |

* cited by examiner

*Primary Examiner* — William E Dondero
*Assistant Examiner* — Robert T Reese
(74) *Attorney, Agent, or Firm* — Milan Milosevic; Lisa Serdynski (57) ABSTRACT

A bicycle rear derailleur includes a base member mountable to a bicycle frame. A movable member is movably coupled to the base member. A chain guide assembly is rotatably connected to the movable member for rotation about a rotation axis. A biasing element is configured to bias the chain guide assembly for rotation in a first rotational direction with respect to the movable member. A damper assembly is operatively disposed between the chain guide assembly and the movable member to apply a damping force to the chain guide assembly when the chain guide assembly rotates in a second rotational direction opposite to the first rotational direction. The damper assembly includes a one-way roller clutch assembly disposed coaxially about the rotational axis and a friction unit extending circumferentially over a circumferential angle coaxially about the rotational axis.

24 Claims, 7 Drawing Sheets

BICYCLE REAR DERAILLEUR WITH A DAMPER ASSEMBLY

BACKGROUND OF THE INVENTION

The present invention generally relates to bicycle rear derailleurs and more particularly to a bicycle rear derailleur with a damper assembly.

As is known, a bicycle derailleur performs shifting operations by shifting the chain between a plurality of adjacent sprockets of a sprocket assembly of a bicycle. A further, also very important function of the derailleur is to ensure a sufficient chain tension. A bicycle derailleur is generally constructed in the following manner. A base member is mounted to the bicycle frame. Further, a movable member is movably connected to the base member and a chain guide assembly is movable connected to the movable member with respect to rotation about a rotational axis. The movable member is movable in the axial direction, to move the chain guide assembly between the sprockets of the sprocket assembly, so that the chain may be shifted from an initial sprocket to a target sprocket. The chain guide assembly is biased in a rotational direction by a torsion spring or the like, namely in the direction of tensioning of the bicycle chain which is guided by the chain guide assembly, to maintain the chain in a tensioned state or to restore a tensioned state after an antecedent state of insufficient chain tensioning. This rotational or pivoting direction is also referred to as "chain tensioning direction." A rotation of the chain guide in this direction increases the tension of the chain and at the same time decreases the tension of the torsion spring acting on the chain guide assembly. Depending on the current sprocket of the sprocket assembly with which the chain is engaged at a given point, the chain guide assembly will take various rotational positions relative to the movable member with regard to the axis of rotation.

Impact on the chain and the chain guide assembly not only results from the shifting of the derailleur by shifting the chain between various sprockets of the sprocket assembly, but also from riding itself. For example, when riding on uneven surfaces, the derailleur and the chain are subjected to blows and vibrations which may act on the chain guide assembly in a rotational direction opposite to the "chain tensioning direction." A rotation of the chain guide assembly in the direction opposite to this "chain tensioning direction" increases the tension of the tension spring acting on the chain guide assembly and directly results in a reduction of the chain tension or at least results in a greater risk of a subsequent reduction of the chain tensioning below a necessary level. Negative effects may be a drop in the chain tensioning with unwanted slackness or "dangling" of the chain. In a worst case, the chain may fall off the sprocket assembly.

To face these problems, conventional solutions are provided with a damper assembly that provides a resistance to rotational movement of the chain guide assembly in the rotational direction of the chain guide assembly opposite to "chain tensioning direction." In this respect, the known solutions each have a one-way clutch and a friction unit, which act together in such a way that the resistance regarding the rotational movement of the chain guide assembly is affected in a rotational direction opposite to the "chain tensioning direction."

The movable member and the chain guide assembly are rotatable relative to each other, but are frictionally coupled via the friction unit and the one-way clutch, which due to the characteristics of the one-way clutch is only effective in the rotational direction opposite to the "chain tensioning direction," so that a dynamic friction is only present in this rotational direction to act against the rotation. In the other rotational direction corresponding to a backwards rotation of the chain guide in the sense of a tensioning of the chain, the chain guide assembly is decoupled from the movable member due to these one-way clutch characteristics, so that the tensioning of the chain by rotating the chain guide assembly encounters no resistance or at least only an irrelevant degree of resistance.

Such a rear derailleur is disclosed in US 2009/0054183 A1. The derailleur includes a damper assembly having a friction unit including a plurality of axially supported friction plates. A one-way roller clutch assembly is arranged radially outwardly of these friction plates in the same axial area, which results in the necessity of a relatively large dimension for the movable member in the radial direction. An advantage of this solution is an adjustment unit having an exposed adjustment nut for adjusting the friction engagement and thus the damping force acting as resistance. This configuration allows the rider to adjust the damping force. However, for such an adjustment a tool is required and the question arises if an average rider has the necessary knowledge to adjust the damping force correctly. Further, the exposed adjustment nut is not protected from undesired rotation which may result in undesired adjustment of the damping force.

Other rear derailleurs with damper assemblies are disclosed in US 2012/0083371 A1 and US 2012/0083872 A1. These damper assemblies also include one-way roller clutch assemblies. The rotational axis of the chain guide assembly serves as an inner clutch member of the roller clutch. The friction unit includes a leaf spring encircling an outer clutch member of the roller clutch and having two end portions radially protruding between two rotational cams or alternatively between an adjustment screw and a rotational cam, which serve for adjusting a basic friction and for controlling a momentarily acting friction via a control lever or the like, so that the cyclist—according to his wishes, for example when riding on different terrain—may select the momentarily acting friction and thus the momentarily acting damping force by the control lever which is movable between two index positions. Providing the cyclist with such a choice calls for a relatively high mechanical effort.

US 2013/0203532 A1 discloses a rear derailleur that includes a sleeve-like friction element extending circumferentially around the roller clutch assembly and having a tapered or conical outer surface. The rotational axis rotatably supporting the chain guide assembly forms the inner clutch member of the roller clutch assembly.

U.S. Pat. No. 4,406,643 discloses several different embodiments of a rear derailleur with a damper assembly. Generally, the damper assembly includes a one-way ratchet clutch and a friction unit having axially arranged friction surfaces. One of the embodiments includes a nut threaded into an inner thread of a tubular holder or threaded onto an external thread of a support shaft and serving as counter-bearing of the friction unit including a friction plate and a dish-shaped spring. The assembly of these prior art embodiments necessarily involves an adjustment of the damping force, since the frictional engagement depends on the actual position of the nut in the respective internal thread or on the respective external thread.

SUMMARY OF THE INVENTION

One object of the present invention is to provide a bicycle rear derailleur which is mechanically simple.

Another object of the present invention is to provide a bicycle rear derailleur which may be easily assembled during manufacturing and provides the correct damping force with high certainty.

Another object of the present invention is to provide a bicycle rear derailleur that has a compact movable member, in particular a radially compact movable member.

Another object of the present invention is to provide a bicycle rear derailleur which has favorable damping characteristics.

One embodiment of the present invention provides a bicycle rear derailleur including a base member mountable to a bicycle frame. A movable member is movably coupled to the base member. A chain guide assembly is rotatably connected to the movable member for rotation about a rotational axis. A biasing element is configured to bias the chain guide assembly for rotation in a first rotational direction with respect to the movable member. A damper assembly is operatively disposed between the chain guide assembly and the movable member to apply a damping force to the chain guide assembly when the chain guide assembly rotates in a second rotational direction opposite to the first rotational direction. The damper assembly includes a one-way roller clutch assembly and a friction unit. The one-way roller clutch assembly and the friction unit are disposed coaxially about the rotational axis. The friction unit is biased against and in frictional engagement with the one-way roller clutch assembly. The one-way roller clutch assembly and the friction unit are sized and shaped to deform the friction unit against the one-way roller clutch assembly. The friction unit may be disposed about or within the one-way roller clutch assembly to deform the friction unit.

The friction unit may include a damping spring having a spring engagement portion extending circumferentially over a circumferential angle coaxially about the rotational axis. The one-way roller clutch assembly includes inner and outer clutch members disposed coaxially about the rotational axis.

The spring engagement portion may include an inner circumferential engagement surface biased against and in frictional engagement with an outer circumferential counter engagement surface of the outer clutch member. The outer circumferential counter engagement surface has a first diameter which expands the spring engagement portion to a corresponding diameter of the inner circumferential engagement surface giving rise to a spring force of the spring engagement portion biasing the inner circumferential engagement surface against the outer circumferential counter engagement surface. When the damping spring is in a relaxed state the inner circumferential engagement surface of the spring engagement portion has a second diameter which is smaller than the first diameter.

The spring engagement portion may include an outer circumferential engagement surface biased against and in frictional engagement with an inner circumferential counter engagement surface of the inner clutch member. The inner circumferential counter engagement surface has a first diameter which compresses the spring engagement portion to a corresponding diameter of the inner circumferential engagement surface giving rise to a spring force of the spring engagement portion biasing the outer circumferential engagement surface against the inner circumferential counter engagement surface. When the damping spring is in a relaxed state the outer circumferential engagement surface of the spring engagement portion has a second diameter which is larger than the first diameter.

The damper assembly may be disposed within a cavity of the movable member coaxially about a rotational shaft supporting the chain guide assembly for rotation about the rotational axis. The rotational shaft may form the inner clutch member of the one-way roller clutch assembly. Alternatively, the rotational shaft may be connected to the inner clutch member for common rotation.

The damping spring may be coupled with the movable member for supporting the spring engagement portion against rotation with respect to the movable member. The wedge member may eliminate the rotational play between the damping spring and the moveable member. The damping spring may include a spring retaining portion extending radially outwardly with respect to the spring engagement portion for coupling the spring engagement portion with the movable member. The spring engagement portion may have a free end. At least one wedge member may be operatively disposed between the spring retaining portion and the movable member. The wedge member may bias the spring retaining portion against a first abutment surface of the movable member. Further, the wedge member may be located between the spring retaining portion and a second abutment surface opposite to the first abutment surface.

At least two wedge members may be operatively disposed between the spring retaining portion and the movable member urging the spring retaining portion in opposite directions between a first abutment surface and a second abutment surface opposite to the first abutment surface. At least one first wedge member may be located between the spring retaining portion and the first abutment surface and at least one second wedge member is located between the spring retaining portion and the second abutment surface.

The damping spring may be configured such that a frictional force which is caused by the frictional engagement between the inner circumferential engagement surface and the outer circumferential counter engagement surface or is caused by the frictional engagement between the outer circumferential engagement surface and the inner circumferential counter engagement surface and which acts against a rotation of the chain guide assembly in said second rotational direction is one of increased and decreased when the chain guide assembly rotates in the second rotational direction.

The spring engagement portion of the damping spring may wrap around the outer circumferential counter engagement surface. The spring engagement portion may wrap more tightly about the outer circumferential counter engagement surface when the chain guide assembly rotates in the second rotational direction to increase the frictional force. The spring engagement portion may wrap more loosely about the outer circumferential counter engagement surface when the chain guide assembly rotates in the second rotational direction to decrease the frictional force.

Another aspect of the present invention is a subassembly unit for a bicycle rear derailleur. The subassembly unit includes a movable member movably couplable to a base member. A rotational shaft is supported for rotational about a rotational axis in a cavity of the movable member. The cavity forms a passage extending between opposite first and second axial sides of the movable member. The rotational shaft is connectable to a chain guide assembly at a first axial end of the rotational shaft. The rotational shaft is supported by a support surface of the movable member in a first axial direction corresponding to a direction from a second axial end of the rotational shaft to the first axial end of the rotational shaft. A damper assembly is disposed in the cavity of the movable member and operatively disposed between the rotational shaft and the movable member. The damper assembly includes a one-way roller clutch assembly disposed coaxially about the rotational axis and a friction unit including a damping spring having a spring engagement portion extending circumferentially over a circumferential angle coaxially about the rotational axis. The spring engagement portion has an inner circumferential engagement surface biased against and in frictional engagement with an outer circumferential counter engagement surface of the one-way roller clutch assembly. The damping spring has a spring retaining portion extending radially outwardly with respect to the spring engagement portion between opposite abutment surfaces of the movable member for coupling the spring engagement portion with the movable member.

The first axial end of the rotational shaft may be accessible from the first axial side of the movable member for connection with the chain guide assembly and the rotational shaft and the damper assembly is inserted into the cavity from the second axial side of the movable member. A retaining flange of the rotational shaft may be axially located between the support surface of the movable member and the damping spring. The retaining flange may be axially located between the first axial end and the damping spring.

A method of manufacturing a bicycle rear derailleur includes the following steps of assembling a subassembly unit. The subassembly unit includes a movable member movably connectable to a base member. A rotational shaft is supported for rotational about a rotational axis in a cavity of the movable member. The cavity forms a passage extending between opposite first and second axial sides of the movable member. The rotational shaft is connectable to a chain guide assembly at a first axial end of the rotational shaft. The rotational shaft is supported by a support surface of the movable member in a first axial direction corresponding to a direction from a second axial end of the rotational shaft to the first axial end of the rotational shaft. A damper assembly is disposed in the cavity of the movable member and operatively disposed between the rotational shaft and the movable member. The damper assembly includes a one-way roller clutch assembly disposed coaxially with respect to the rotational axis and a friction unit including a damping spring having a spring engagement portion extending circumferentially over a circumferential angle about and coaxial with respect to the rotational axis. The spring engagement portion has an inner circumferential engagement surface biased against and in frictional engagement with an outer circumferential counter engagement surface of the one-way roller clutch assembly. The damping spring has a spring retaining portion extending radially outwardly with respect to the spring engagement portion between opposite abutment surfaces of the movable member for coupling the spring engagement portion with the movable member. The rotational shaft and the damper assembly are inserted into the cavity from the second axial side of the movable member so that the first axis end of the rotational shaft is accessible from the first axial side of the movable member. The rotational shaft at the first axial end is connected with a chain guide assembly. The movable member is coupled to the base member.

These and other features and advantages of the present invention will be more fully understood from the following description of one or more embodiments of the invention, taken together with the accompanying drawings.

DETAILED DESCRIPTION

Several embodiments of the invention will herein by described with reference to the drawings. It will be understood that the drawings and description set out herein are provided for illustration only and do not limit the invention as defined by the claims appended hereto and any and all equivalence. For example, terms such as "first" and "second," "upper" and "lower," or "forward" and "rearward" are used for the sake of orientation and not as terms of limitation. Moreover, the terms preferably refer to the bicycle derailleur conventionally mounted to a bicycle and with the bicycle orientated for normal use unless otherwise indicated. For example, the front of an element would be that part of the element oriented/closest to the front of the bicycle.

Looking to FIGS. 1-6, a bicycle derailleur 10 is shown according to one embodiment of the present invention. The bicycle derailleur 10 generally includes a base member 12, a movable member 16, a swing linkage 18, a chain guide assembly 26 and a damper assembly 38. The base member 12, also known as a "b-knuckle," may be mounted to a bicycle frame 11 by a fastening element 14 such as a screw or the like. The swing linkage 18, in this embodiment a parallelogram, includes outer and inner links 20, 22 pivotally connected to the base member 12 by a pair of pivot pins 24 or bolts. The movable member 16, also known as a "p-knuckle," is pivotally connected to the links 20, 22 at ends of the links 20, 22 opposite to the base member 12. The movable member 16 is pivotally connected by a pair of further pivot pins 24 to the swing linkage 18 in a similar manner as the base member 12. In principle, various means for coupling the movable member 16 with the base member 12 are imaginable within the scope of the invention.

The movable member 16 is movable by the swing linkage 18 in a well-known manner in a sideward direction relative to the bicycle frame 11 to shift a chain 35 (shown schematically in FIG. 1) by the chain guide assembly 26 between the sprockets of a sprocket assembly 13 mounted to the rear wheel of the bicycle. The swing linkage 18 includes a biasing element 21, in this embodiment a spring, to tension the derailleur 10 in the direction of an initial travel position as is common knowledge in this field of expertise. The chain guide assembly 26 is rotatably mounted to the movable member 16 and is biased in a chain tensioning direction T by a biasing element, in this embodiment torsion spring 44 (see FIG. 5). Looking to FIG. 1, a forward direction F corresponds to the forward direction of a bicycle. A rotational direction of the chain guide assembly 26, in which the guided chain is tensioned, is denoted with T. The rotational direction in the forward direction F opposite to the chain tensioning direction T is denoted by chain slackening direction L. Rotation of the chain guide assembly 26 in the chain slackening direction L may result in an undesired reduction of chain tensioning which may result in the chain disengaging with one of the sprockets. The chain guide assembly 26 includes an outer plate 28 and an inner plate 30, spaced apart. An upper guide wheel 32 and a lower guide wheel 34 are rotatably arranged between the outer and inner plates 28 and 30 for receiving the chain 35.

Figure 1:
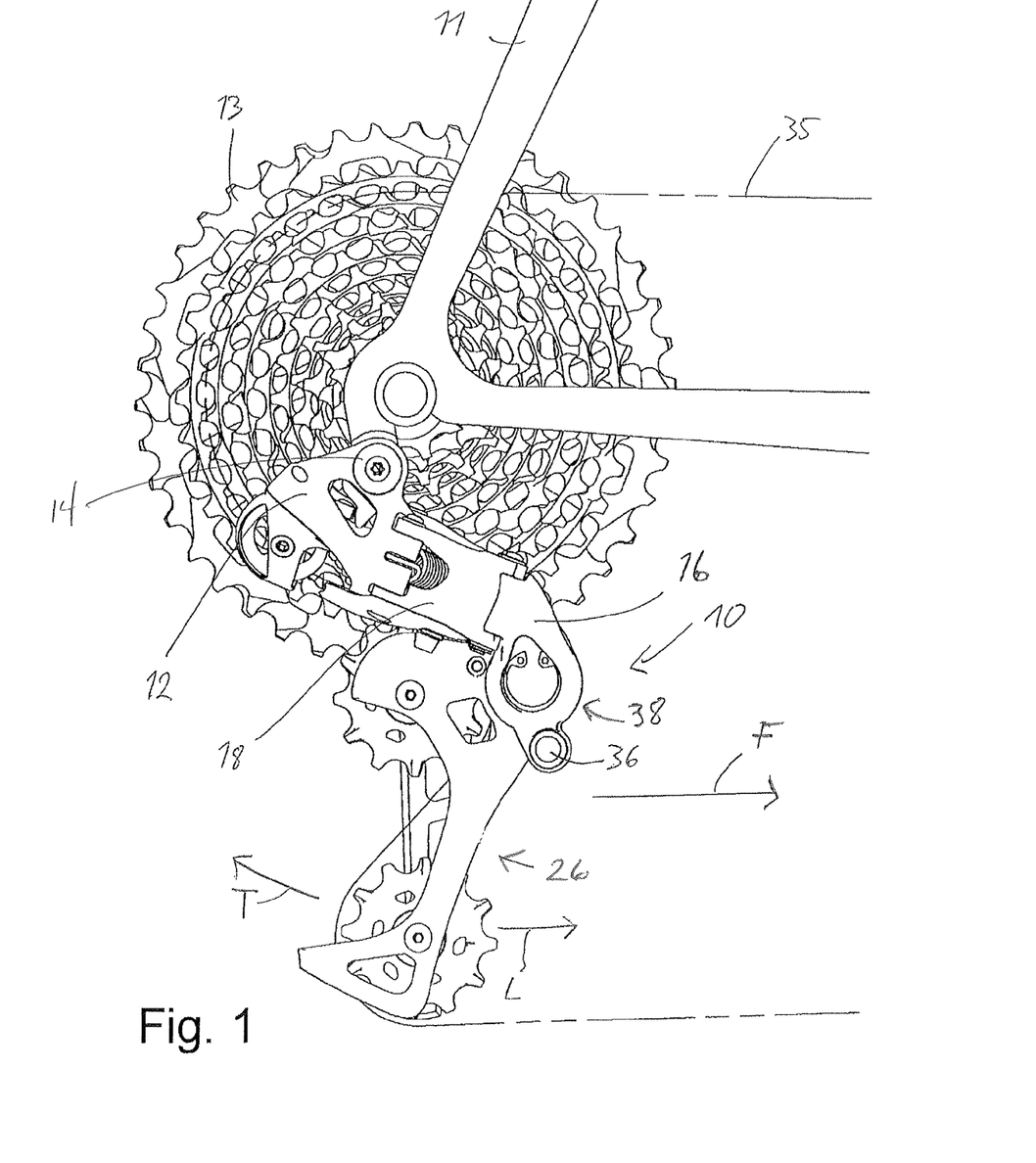
FIG. 1 is a side view of a rear derailleur including a damper assembly according to one embodiment of the present invention.
Figure 2:
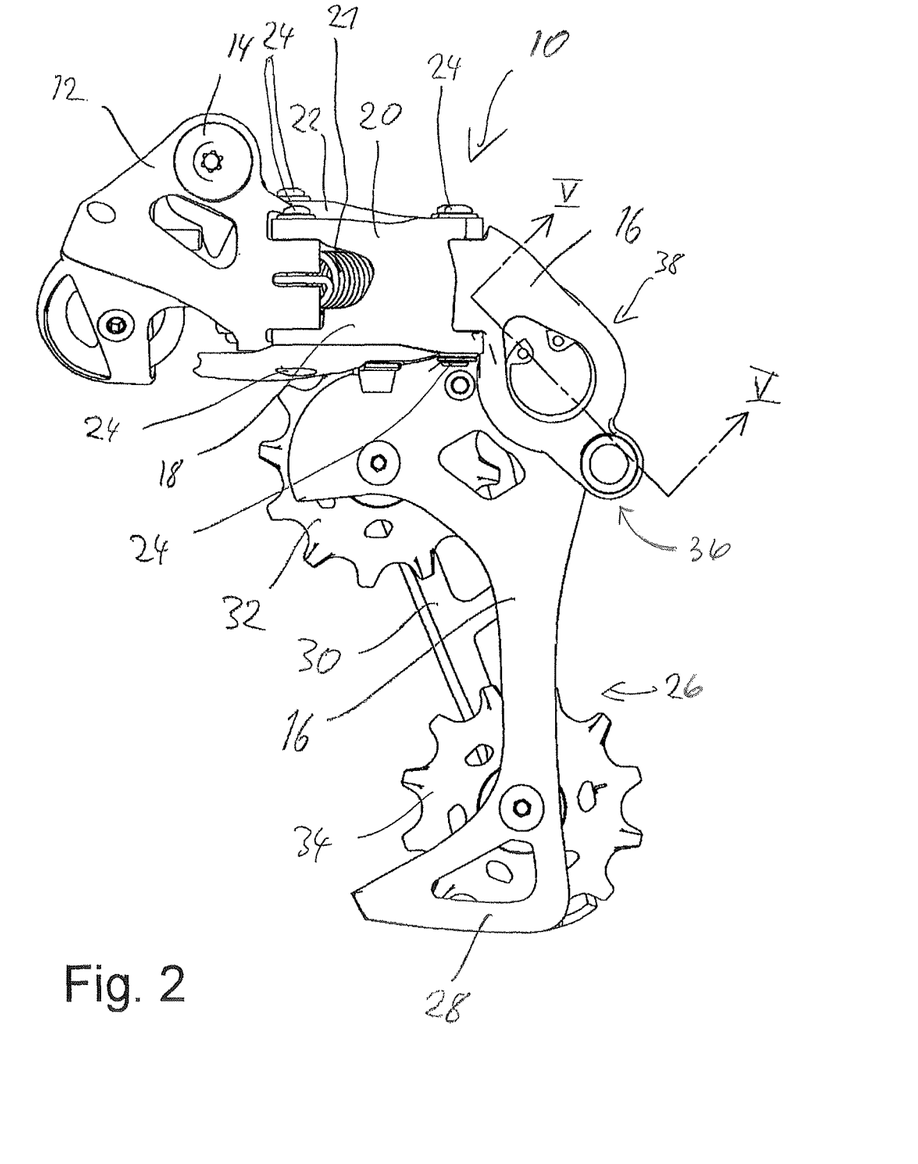
FIG. 2 is a side view of the rear derailleur of FIG. 1.
Figure 3:
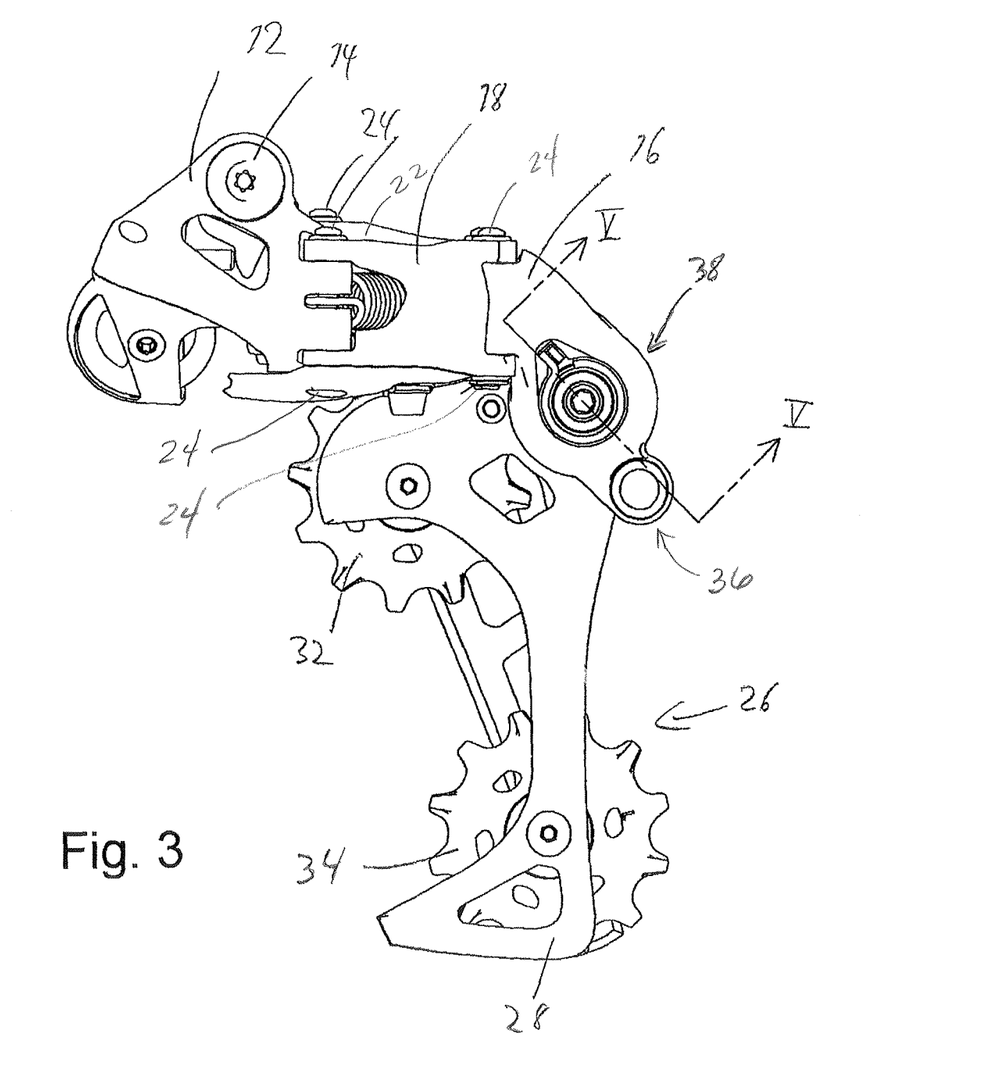
FIG. 3 is a side view of the rear derailleur of FIG. 1, except a cap and a retaining ring are removed to expose an axial view of the damper assembly

The movable member 16 may include a chain guide locking mechanism 36 that fixes the chain guide assembly 26 in a certain rotational position with respect to the movable member 16 so that maintenance work may be easily performed (see FIG. 1). Looking to FIG. 5, the outer plate 28 is connected in a rotatably fixed manner with a rotational shaft 50 which is supported for rotation in a cavity 90 of the movable member 16. The cavity 90 may form a passage extending between opposite first and second axial sides 91, 93 of the movable member 16. An intermediate washer 52 is located between the outer plate 28 and the movable member 16. The intermediate washer 52 is connected to the outer plate 28 in a rotatably fixed manner by protrusions (not shown) engaging in openings of the plate. The outer plate 28, including the intermediate washer 52, is connected to a first axial end 55 of the rotational shaft 50 by a screw 54 being screwed into an internal thread of the rotational shaft 50. The rotational shaft 50 includes a tool engagement feature 53 in a second axial end 57 opposite to the inner thread into which the screw 54 is engaged, which facilitates to tighten the screw 54. The shaft 50 is axially supported by a retaining flange 51 abutting against an annular support surface 59 of the movable member 16 defining the cavity 90 in a stepped manner. The torsion spring 44 engages on the one hand with a coupling portion in a positive-locking manner in the movable member 16 and on the other hand with a coupling portion in a positive-locking manner in the intermediate washer 52 and the outer plate 28, so that the spring 44 biases the chain guide assembly 26 in the chain tensioning direction T to maintain or restore the necessary tensioning of the chain which is engaged in the usual manner with the guide wheels 32, 34.

Figure 5:
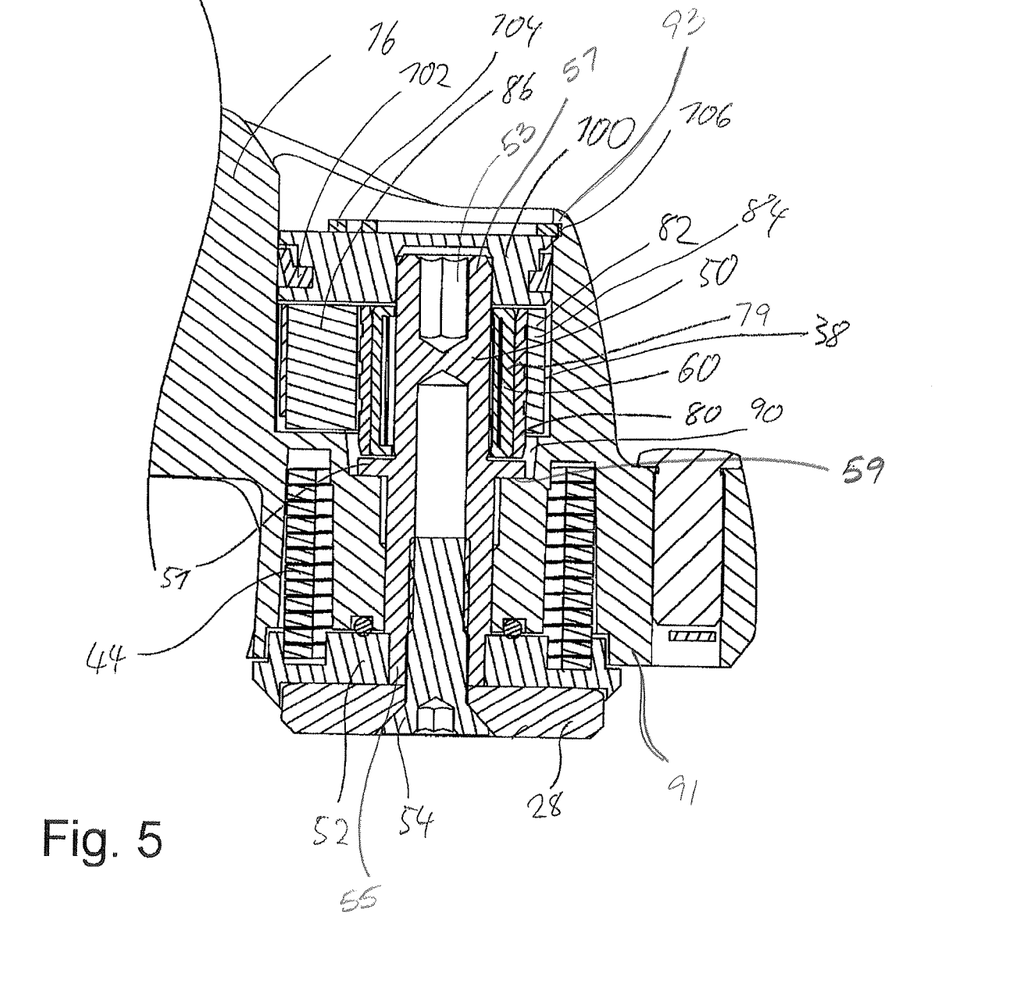
FIG. 5 is a cross-sectional view of the damper assembly taken along V-V of FIGS. 2, 3 and 4.
Figure 6:
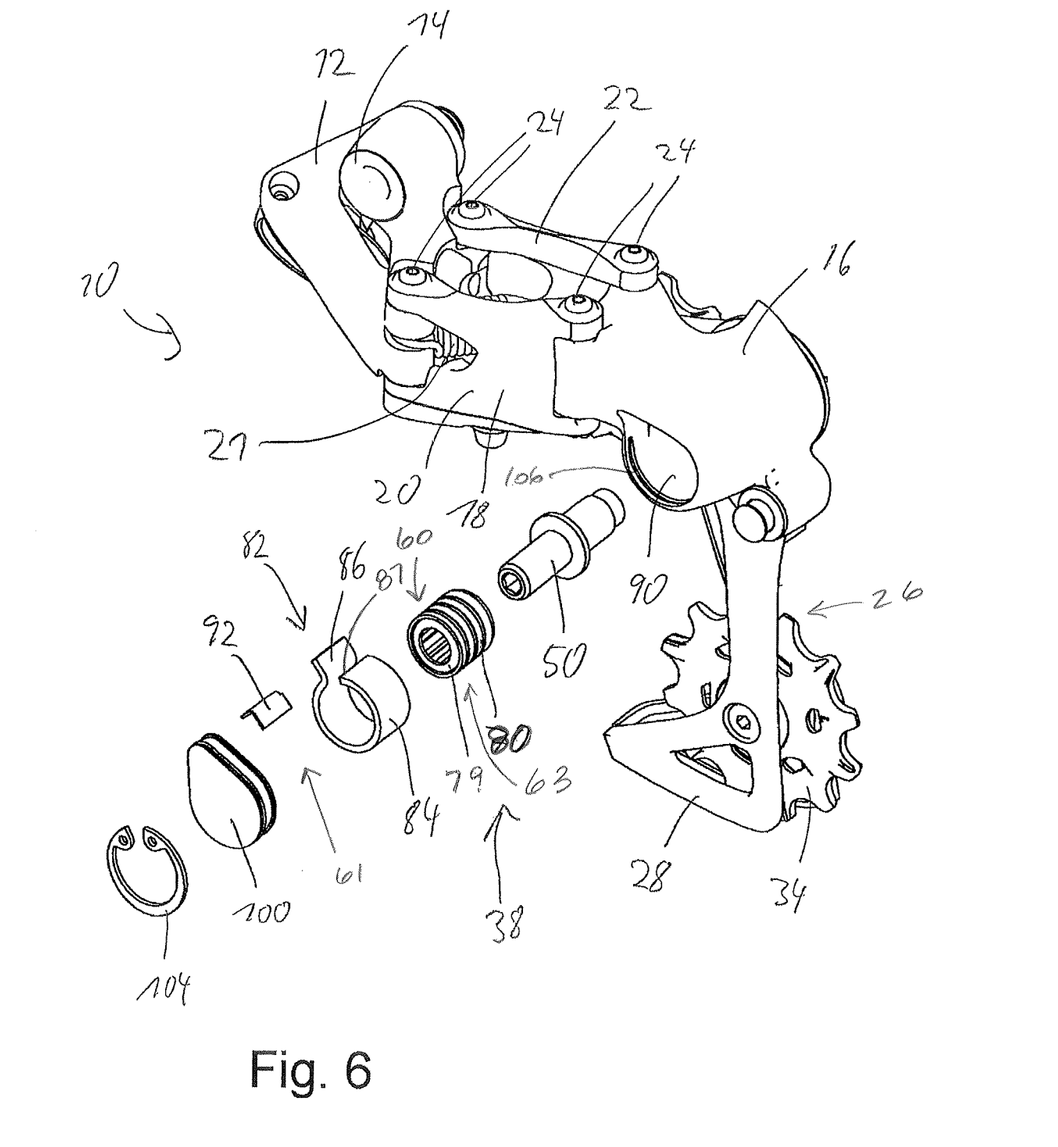
FIG. 6 is an exploded view of the damper assembly with the base member, swing linkage and the movable member of the rear derailleur of FIG. 1.

Looking to FIGS. 5 and 6, the cavity 90 may be closed on the axial side opposite to the outer plate 28 by a cap 100. The cap 100 may have an elastic seal 102 made of rubber disposed in a recess in the outer circumference of the cap 100 and in sealing engagement with the inner circumference of the cavity 90 of the movable member 16. The cap 100 and seal 102 may be disposed entirely inside the cavity and may have a recess for receiving an end of the rotational shaft 50, so that the rotational shaft may rotate relative to the cap 100. For holding the cap 100 in its place, a retaining ring 104 may be provided, which engages in a groove 106 formed in the inner circumferential surface of the cavity 90 of the movable member 16.

The movable member 16 includes the damper assembly 38 for damping the rotational movement of the chain guide assembly 26 relative to the movable member 16 in the chain slackening direction L opposite to the chain tensioning direction T. The damper assembly 38 generally includes a one-way roller clutch assembly 60 and a friction unit 61. The damper assembly 38 applies a damping force to the chain guide assembly 26 which opposes a rotation in the chain slackening direction L opposite to the chain tensioning direction T relatively to the movable member 16.

In this embodiment, the one-way roller clutch assembly 60 includes inner clutch member or the rotational shaft 50 and outer clutch member 63 and roller elements acting between the inner and outer clutch members. In this embodiment, the rotational shaft 50 forms the inner clutch member. Alternatively, the inner clutch member may be a sleeve or the like, connected in a rotatably fixed manner to the rotational shaft 50. The outer clutch member 63 includes a first sleeve 79 and a second sleeve 80. The first sleeve 79 is press fitted into the second sleeve 80 such that the first and second sleeves 79, 80 are connected in a rotatably fixed manner and do not move in the axial direction with respect to each other. The sleeve 80 may be made of hardened steel and may have circumferential groves along its outer surface to retain lubricating grease for safeguarding appropriate frictional characteristics of the friction unit 61. The roller clutch assembly 60 is configured such that the rotational direction of the rotational shaft 50 corresponding to the chain tensioning direction T is the one-way rotational direction of the roller clutch assembly, in which the inner clutch member or shaft 50 may rotate freely with respect to the outer clutch member 63. The chain slackening direction L being opposite to the chain tensioning direction T corresponds to the locking direction of the roller clutch assembly 60, in which a rotation of the inner clutch member or shaft 50 with respect to the outer clutch member 63 of the roller clutch 60 is locked so that the rotational shaft 50 and thus the chain guide assembly 26 may only rotate in this direction by entraining the outer clutch member 63 for common rotation.

The roller clutch assembly 60 may be formed as a drawn cup roller clutch, which is a sleeve-like element retaining on its inner circumference the roller elements and which is combined with the rotational shaft 50 which serves as inner clutch member. The drawn cup roller clutch includes a thin-walled, formed outer ring with locking rams on the inside diameter, a cage (typically plastic cage) and needle rollers positioned by springs. Torque is only transmitted in one direction and there is a low idling frictional torque in the other direction. A drawn cup roller clutch may be fitted by pressing into a housing. In order to support torque transmission, a drawn cup roller clutch may be supplied with a knurled outer ring.

Figure 4:
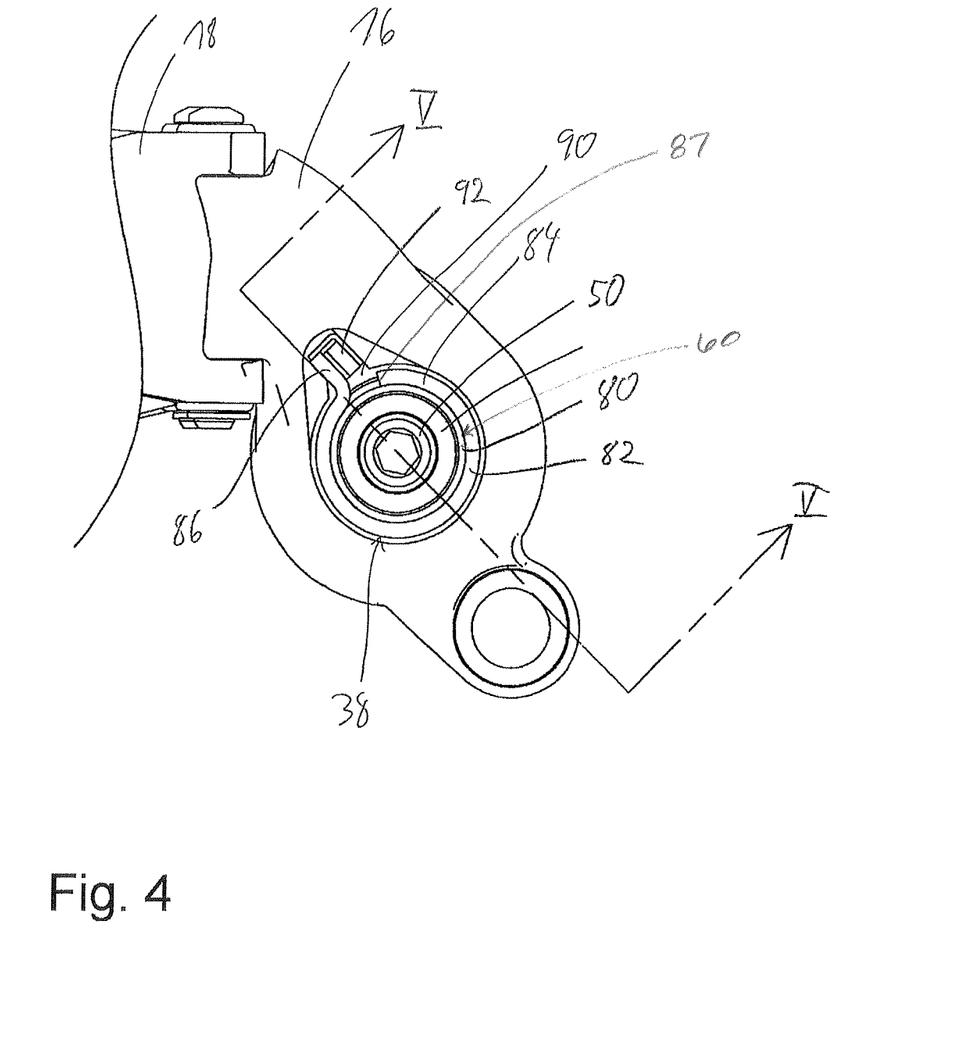
FIG. 4 is an enlarged side view of the damper assembly of the rear derailleur of FIG. 3.

The friction unit 61 includes a damping spring 82 which has a general shape shown in FIGS. 4 and 5. The damping spring 82 and the one-way roller clutch assembly 60 are disposed coaxially about the rotational shaft 50. The damping spring 82 may be made from a metallic material such as spring-tempered steel or the like. The damping spring 82 includes a spring engagement portion 84 and a spring retaining portion 86 extending radially outwardly with respect to the spring engagement portion 84. The damping spring 82 is supported against rotation with respect to the movable member 16 by the spring retaining portion 86 extending between opposite abutment surfaces of the movable member, as seen in FIG. 4. A wedge member 92, in this embodiment a biasing clip, is inserted into the cavity 90 of the movable member 16 to bias the spring retaining portion 86 against an abutment surface of the movable member in the cavity 90 so that the spring retaining portion 86 is supported against rotation with respect to the movable member 16 in both rotational directions and does not move relative to the movable member 16. The wedge element 92 may be made of spring-tempered sheet steel or the like.

The spring engagement portion 84 extends circumferentially over a circumferential angle coaxially about the rotational axis or shaft 50. The spring engagement portion 84 has a free end 87. The spring engagement portion 84 has an inner circumferential engagement surface that engages with an outer circumferential counter engagement surface of the second sleeve 80 of the outer clutch member 63. The one-way roller clutch assembly 60 has an outer diameter that is larger than an inner diameter of the spring engagement portion 84. For example, the one-way roller clutch assembly may have an outer diameter of 14 mm and the spring engagement portion 84 has an inner diameter of 13.5 mm in a relaxed state before being assembled with the one-way roller clutch assembly 60. Thus, when the one-way roller clutch 60 is received in the inner diameter of the spring engagement portion 84, the inner diameter of the spring engagement portion 84 expands to exert a radially inward directed force on the outer circumferential counter surface of the second sleeve 80 such that relative rotational movement is allowed between the second sleeve 80 and the damping spring 82 against frictional counter forces resulting from the frictional engagement between the inner circumferential engagement surface of the engagement portion 84 and the outer circumferential counter engagement surface of the second sleeve 80. Alternatively, the second sleeve 80 may be eliminated and an outer circumferential engagement surface of the first sleeve 79 of outer clutch member 63 may be in direct frictional engagement with the inner circumferential engagement surface of the spring engagement portion 84. From FIGS. 5 and 6, it is clear how and in which sequence the different components of the damper assembly 38 are to be inserted into the cavity 90.

The operation of the damper assembly 38 is as follows. When the chain guide assembly 26 rotates in the chain slackening direction opposite to the chain tensioning direction T (counter-clockwise in FIG. 1), the shaft 50, which is supported for rotation with the cavity 90, rotates with the chain guide assembly 26. Since the shaft 50 is engaged with the rollers of the roller clutch assembly 60 and the roller clutch assembly 60 is configured to "lock" in this direction, the one-way clutch assembly 60 must also rotate in this direction with the shaft 50. Because the spring engagement portion 84 of the damping spring 82 exerts a radially inwardly directed force on the sleeve 80, frictional forces between the damping spring 82 and the sleeve 80 urge the damping spring 82 to rotate with the sleeve 80. However, rotation of the damping spring 82 is prevented by the spring retaining portion 86 which abuts against a surface in the cavity 90 of the movable member 16 as shown in FIG. 4. Thus, the sleeve 80 rotates relative to the damping spring 82 and energy is dissipated to overcome the frictional forces between the sleeve 80 and the spring engagement portion 84 of the damping spring 82. In this way, the rotational motion of the chain guide assembly 26 in the chain slackening direction L is dampened by a frictional counter force which acts against this rotation of the chain guide assembly 26 in the chain slackening direction L.

When the cage rotates in the chain tensioning direction T (clockwise in FIG. 1), the shaft 50 rotates with it. The roller clutch assembly 60 is configured to allow relative rotation of the shaft 50 in this direction. In other words, the roller clutch assembly 60 allows the shaft 50 to rotate freely in this direction. Thus, the damper assembly 38 does not dampen motion of the chain guide assembly 26 in the chain tensioning direction T.

It should be noted that the damping spring 82, according to the orientation of the spring engagement portion 84 with respect to the spring retaining portion 86 and the resulting wrapping sense of the spring engagement portion 84 with respect to the sleeve 80 is configured such that the engagement spring portion 84 has a tendency to "self-energize," which means that it has a tendency to wrap even more tightly around the sleeve 80 when the sleeve rotates counter-clockwise in the chain slackening direction L, so that the friction between the damping spring 82 and the roller clutch 60 is increased.

Figure 7:
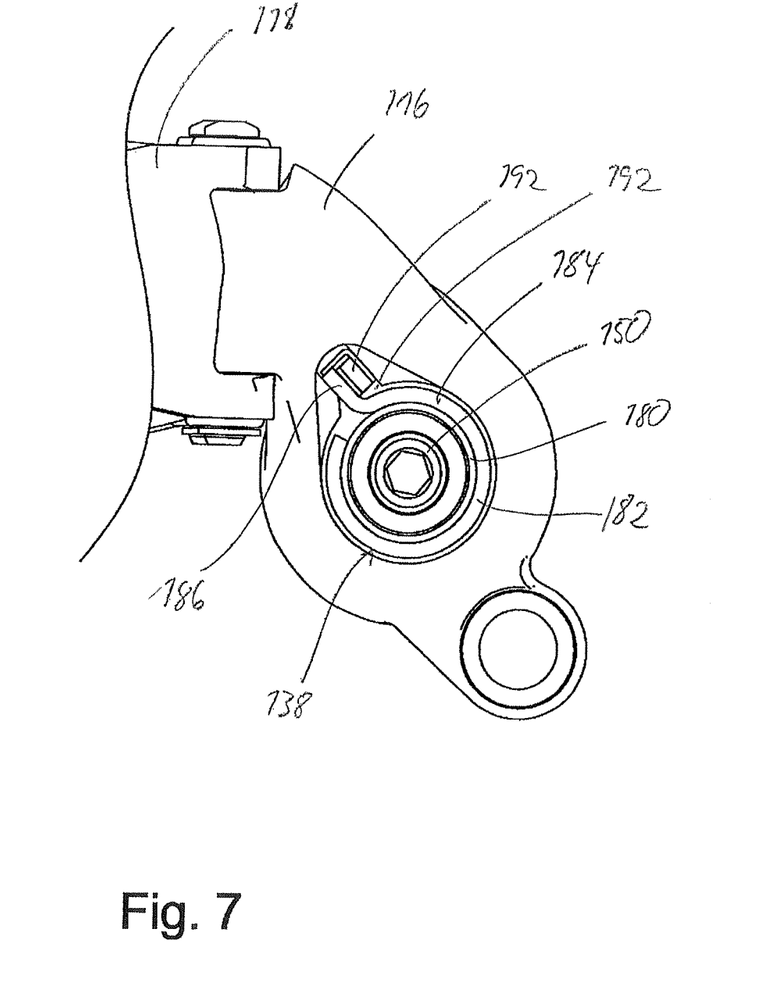
FIG. 7 is an enlarged side view of a damper assembly for a rear derailleur according to another embodiment of the present invention.

FIG. 7 shows another embodiment of the present invention. A damping spring 182 wraps the opposite way around a sleeve 180 and therewith the assembly formed by the sleeve, the roller clutch 160 and the rotational shaft 150 which is supported for rotation in the cavity 190 of the movable member 116. This alternative embodiment corresponds to the embodiment shown in FIGS. 1-6 except for this alternative orientation and wrapping sense of the spring engagement portion 184, so that further additional explanations are not necessary. For the second embodiment of FIG. 7 the same reference signs are used as for the first embodiment of FIGS. 1-6, respectively increased by 100.

According to the alternative embodiment of FIG. 7, wherein the roller clutch assembly 160 rotates counter-clockwise in the chain slackening direction, the damping spring 182 has a tendency to "unwrap" itself from around the sleeve 180, which has the result of reducing the friction between the engagement spring portion 184 and the sleeve 180. This may have the benefit of "smoother" relative motion between the damping spring 182 and roller clutch assembly 160.

According to the shown embodiments, the damping spring 82 with its spring engagement portion 84 is located radially outwardly with respect to the radial outer clutch member 63 of the roller clutch assembly 60, and the spring engagement portion 84 is expanded by the roller clutch. It is feasible to arrange a damping spring with its engagement portion radially inwardly with respect to the radial inner clutch member of the roller clutch to be compressed by an effective inner circumference for achieving the frictional engagement providing the required damping forces. Such a damping spring could be coupled at a retaining portion of the rotational shaft and the outer clutch member of the roller clutch could be coupled with the movable member, so that the relative position of the roller clutch and the damping spring between the chain guide assembly on the one hand and the movable member on the other hand would be interchanged.

A major advantage of the embodiments according to the invention is that the damping assembly needs no adjustment, even no adjustment in the course of the assembly when the derailleur is manufactured. The frictional engagement between the damping spring and the one-way roller clutch assembly is defined by the dimensions of the involved components, i.e. the inner diameter of the engagement portion of the damping spring and the outer diameter of the outer clutch member of the roller clutch assembly in the present embodiments. These diameters are defined from the manufacturing of those components. Another advantage of the embodiments according to the invention is that the damper assembly may be relatively compact in axial direction as well as in radial direction, so that a compact movable member may be provided.

While this invention has been described by reference to several embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A bicycle rear derailleur comprising:
a base member mountable to a bicycle frame; a movable member movably coupled to the base member;
a chain guide assembly rotatably connected to the movable member for rotation about a rotational axis;
a biasing element configured to bias the chain guide assembly for rotation in a first rotational direction with respect to the movable member; and
a damper assembly operatively disposed between the chain guide assembly and the movable member to apply a damping force to the chain guide assembly when the chain guide assembly rotates in a second rotational direction opposite to the first rotational direction, the damper assembly including:
a one-way roller clutch assembly disposed coaxially about a rotational axis, the one-way roller clutch assembly including inner and outer clutch members disposed coaxially about the rotational axis, and
a friction unit disposed coaxially about the rotational axis, the friction unit biased against and in frictional engagement with the one-way roller clutch assembly, the friction unit includes a damping spring having a spring engagement portion extending circumferentially over a circumferential angle coaxially about the rotational axis, the damping spring is coupled with the movable member for supporting the spring engagement portion against rotation with respect to the movable member, the damping spring has a spring retaining portion extending radially outwardly with respect to the spring engagement portion for coupling the spring engagement portion with the movable member, the spring engagement portion having a circumferentially extending free end, and
the one-way roller clutch assembly and the friction unit sized and shaped to deform the friction unit against the one-way roller clutch assembly.

2. The bicycle rear derailleur of claim 1, wherein the spring engagement portion includes an inner circumferential engagement surface biased against and in frictional engagement with an outer circumferential counter engagement surface of the outer clutch member, the outer circumferential counter engagement surface having a first diameter which expands the spring engagement portion to a corresponding diameter of the inner circumferential engagement surface giving rise to a spring force of the spring engagement portion biasing the inner circumferential engagement surface against the outer circumferential counter engagement surface.

3. The bicycle rear derailleur of claim 2, wherein when the damping spring is in a relaxed state the inner circumferential engagement surface of the spring engagement portion has a second diameter which is smaller than the first diameter of the outer circumferential counter engagement surface.

4. The bicycle rear derailleur of claim 1, wherein the spring engagement portion includes an outer circumferential engagement surface biased against and in frictional engagement with an inner circumferential counter engagement surface of the inner clutch member, the inner circumferential counter engagement surface having a first diameter which compresses the spring engagement portion to a corresponding diameter of the inner circumferential engagement surface giving rise to a spring force of the spring engagement portion biasing the outer circumferential engagement surface against the inner circumferential counter engagement surface.

5. The bicycle rear derailleur of claim 4, wherein when the damping spring is in a relaxed state the outer circumferential engagement surface of the spring engagement portion has a second diameter which is larger than the first diameter of the inner circumferential counter engagement surface.

6. The bicycle rear derailleur of claim 1, wherein the damper assembly is disposed within a cavity of the movable member coaxially about a rotational shaft supporting the chain guide assembly for rotation about the rotational axis.

7. The bicycle rear derailleur of claim 6, wherein the rotational shaft forms the inner clutch member of the one-way roller clutch assembly.

8. The bicycle rear derailleur of claim 6, wherein the rotational shaft is connected to the inner clutch member of the one-way roller clutch assembly for common rotation.

9. The bicycle rear derailleur of claim 1, wherein at least one wedge member is operatively disposed between the spring retaining portion and the movable member.

10. The bicycle rear derailleur of claim 9, wherein the at least one wedge member biases the spring retaining portion against a first abutment surface of the movable member.

11. The bicycle rear derailleur of claim 10, wherein the at least one wedge member is located between the spring retaining portion and a second abutment surface opposite to the first abutment surface.

12. The bicycle rear derailleur of claim 1, wherein at least two wedge members are operatively disposed between the spring retaining portion and the movable member urging the spring retaining portion in opposite directions between a first abutment surface and a second abutment surface opposite to the first abutment surface.

13. The bicycle rear derailleur of claim 12, wherein at least one first wedge member is located between the spring retaining portion and the first abutment surface and at least one second wedge member is located between the spring retaining portion and the second abutment surface.

14. The bicycle rear derailleur of claim 13 wherein the at least one wedge member is a metallic spring.

15. The bicycle rear derailleur of claim 1, wherein the damping spring is metallic.

16. The bicycle rear derailleur of claim 1, wherein the damping spring is configured such that the frictional force between the damping spring and the one-way roller clutch assembly, which acts against a rotation of the chain guide assembly in the second rotational direction, is increased when the chain guide assembly rotates in the first rotational direction and decreased when the chain guide assembly rotates in the second rotational direction.

17. A bicycle rear derailleur comprising:
a base member mountable to a bicycle frame; a movable member movably coupled to the base member;
a chain guide assembly rotatably connected to the movable member for rotation about a rotational axis;
a biasing element configured to bias the chain guide assembly for rotation in a first rotational direction with respect to the movable member; and
a damper assembly operatively disposed between the chain guide assembly and the movable member to apply a damping force to the chain guide assembly when the chain guide assembly rotates in a second rotational direction opposite to the first rotational direction, the damper assembly including:
a one-way roller clutch assembly including inner and outer clutch members disposed coaxially about the rotational axis, and a friction unit including a damping spring having a spring engagement portion extending circumferentially over a circumferential angle coaxially about the rotational axis, the damping spring coupled with the movable member for supporting the spring engagement portion against rotation with respect to the movable member, the spring engagement portion having an inner circumferential engagement surface biased against and in frictional engagement with an outer circumferential counter engagement surface of the outer clutch member, the damping spring has a spring retaining portion extending radially outwardly with respect to the spring engagement portion for coupling the spring engagement portion with the movable member, the spring engagement portion wrapping around the outer circumferential counter engagement surface, the spring engagement portion having a circumferentially extending free end, the damping spring configured such that a frictional force caused by the frictional engagement between the inner circumferential engagement surface and the outer circumferential counter engagement surface is increased when the chain guide assembly rotates in the first rotational direction and decreased when the chain guide assembly rotates in the second rotational direction.

18. The bicycle rear derailleur of claim 17, wherein the spring engagement portion wraps more tightly about the outer circumferential counter engagement surface when the chain guide assembly rotates in the second rotational direction to increase the frictional force.

19. The bicycle rear derailleur of claim 17, wherein the spring engagement portion wraps more loosely about the outer circumferential counter engagement surface when the chain guide assembly rotates in the second rotational direction to decrease the frictional force.

20. A subassembly unit for a bicycle rear derailleur, the subassembly unit comprising:
    a movable member movably connectable to a base member;
    a rotational shaft supported for rotational about a rotational axis in a cavity of the movable member, the cavity forming a passage extending between opposite first and second axial sides of the movable member, the rotational shaft connectable to a chain guide assembly at a first axial end of the rotational shaft, the rotational shaft supported by a support surface of the movable member in a first axial direction corresponding to a direction from a second axial end of the rotational shaft to the first axial end of the rotational shaft; and
    a damper assembly disposed in the cavity of the movable member and operatively disposed between the rotational shaft and the movable member, the damper assembly including:
    a one-way roller clutch assembly disposed coaxially about the rotational axis, and a friction unit including a damping spring having a spring engagement portion extending circumferentially over a circumferential angle coaxially about the rotational axis, the spring engagement portion having an inner circumferential engagement surface biased against and in frictional engagement with an outer circumferential counter engagement surface of the one-way roller clutch assembly, the damping spring having a spring retaining portion at a first end extending radially outwardly with respect to the spring engagement portion between opposite abutment surfaces of the movable member for coupling the spring engagement portion with the movable member, a circumferentially extending second end of the damping spring being free of the retaining portion.

21. The subassembly unit of claim 20, wherein the first axial end of the rotational shaft is accessible from the first axial side of the movable member for connection with the chain guide assembly and the rotational shaft and the damper assembly is inserted into the cavity from the second axial side of the movable member.

22. The subassembly unit of claim 21, wherein a retaining flange of the rotational shaft is axially located between the support surface of the movable member and the damping spring.

23. The subassembly unit of claim 22, wherein the retaining flange is axially located between the first axial end and the damping spring.

24. A method of manufacturing a bicycle rear derailleur comprising the steps of:
    assembling a subassembly unit including:
        a movable member movably couplable to a base member, a rotational shaft supported for rotational about a rotational axis in a cavity of the movable member, the cavity forming a passage extending between opposite first and second axial sides of the movable member, the rotational shaft connectable to a chain guide assembly at a first axial end of the rotational shaft, the rotational shaft supported by a support surface of the movable member in a first axial direction corresponding to a direction from a second axial end of the rotational shaft to the first axial end of the rotational shaft, and
        a damper assembly disposed in the cavity of the movable member and operatively disposed between the rotational shaft and the movable member, the damper assembly including:
        a one-way roller clutch assembly disposed coaxially about the rotational axis, and a friction unit including a damping spring having a spring engagement portion extending circumferentially over a circumferential angle coaxially about the rotational axis, the spring engagement portion having an inner circumferential engagement surface biased against and in frictional engagement with an outer circumferential counter engagement surface of the one-way roller clutch assembly, the damping spring having a spring retaining portion at one end extending radially outwardly with respect to the spring engagement portion between opposite abutment surfaces of the movable member for coupling the spring engagement portion with the movable member, a second end of said damping spring having a circumferentially extend free end, inserting the rotational shaft and the damper assembly into the cavity from the second axial side of the movable member so that the first axis end of the rotational shaft is accessible from the first axial side of the movable member;
    connecting the rotational shaft at the first axial end with a chain guide assembly; and
    coupling the movable member to the base member.

* * * * *